UNITED STATES PATENT OFFICE.

JOSEPH LEVY, OF CHICAGO, ILLINOIS.

IMPROVED MEDICINE.

Specification forming part of Letters Patent No. 57,155, dated August 14, 1866.

*To all whom it may concern:*

Be it known that I, JOSEPH LEVY, of Prussia, resident of Chicago, in the county of Cook and State of Illinois, have invented a new and useful Medicine for Treating Abdominal Diseases and Female Irregularities; and I do hereby declare that the following is a full and exact description thereof, reference being had to the accompanying specimens of the ingredients and of the medicine itself.

My experience proved to me that decoctions and juices of young oak-rind, black radish, parsley, camomile-flowers, peppermint, and cinnamon, when mixed in certain proportions, constitute a very efficient medicine against stomach and bowel complaints, as also against female irregularities. Preparing the medicine out of the above-named ingredients, I use them in different proportions, sometimes omitting some of them altogether, and diversifying their quantities according to the age and constitution of the patients, as also according to the stage of sickness.

For grown persons I generally use the above-named ingredients in the following proportions: First, decoction of rind of a young oak tree peeled in the month of May, one-half ($\frac{1}{2}$) ounce; second, decoction of camomile-flowers, one-quarter ($\frac{1}{4}$) ounce; third, green parsley juice, one-quarter ($\frac{1}{4}$) ounce, or one (1) drop of parsley-oil; fourth, black-radish rind juice, one-quarter ($\frac{1}{4}$) ounce; fifth, decoction of peppermint, one-eighth ($\frac{1}{8}$) ounce, or two (2) drops of peppermint-oil; sixth, decoction of cinnamon, one-sixteenth ($\frac{1}{16}$) ounce, or four (4) drops of cinnamon-oil. The decoctions and juices being prepared beforehand, the medicine is made by taking the ingredients in the above-named proportions, mixing them thoroughly, and adding to the whole seven (7) table-spoonfuls of warm water.

The ingredients may be prepared also in dry powders, using bark, leaves, and flowers for the purpose, and an infusion of tea made out them.

In abdominal diseases, as bowel complaint, diarrhea, dysentery, or cholera, I mix all the ingredients together in the above-given proportions, and administer the medicine to the grown persons in doses of a table-spoonful of medicine in half a tea-cup of warm water. I give it sometimes once a day, before breakfast, sometimes twice a day, in the morning and in the evening, sometimes every three hours. For children, in summer complaints, preparing the medicine, I omit parsley and black radish altogether, and add but little of cinnamon to the other three ingredients, administering this medicine in doses of half a tea-spoon of medicine in a tea-spoonful of warm water.

In female irregularities, I add to the medicine prepared of all the ingredients in the above given proportions, yet one-sixteenth ($\frac{1}{16}$) ounce of saffron.

The medicine should be always taken warm. Red wine may be used with it. Milk and sour dishes should be avoided by patients while under treatment. The medicine acts very favorably when used in small doses, even by healthy persons, for restoring the tone of their stomach and creating appetite.

Having thus described my medicine, what I claim as my invention, and desire to secure by Letters Patent, is—

The medicine prepared from decoctions and juices or powders of young oak-tree rind, camomile-flowers, parsley, black-radish rind, peppermint, and cinnamon, in the manner and proportions herein described and specified.

JOSEPH LEVY.

Witnesses:
J. B. TURCHIN,
W. C. DODGE.